Figure 1:
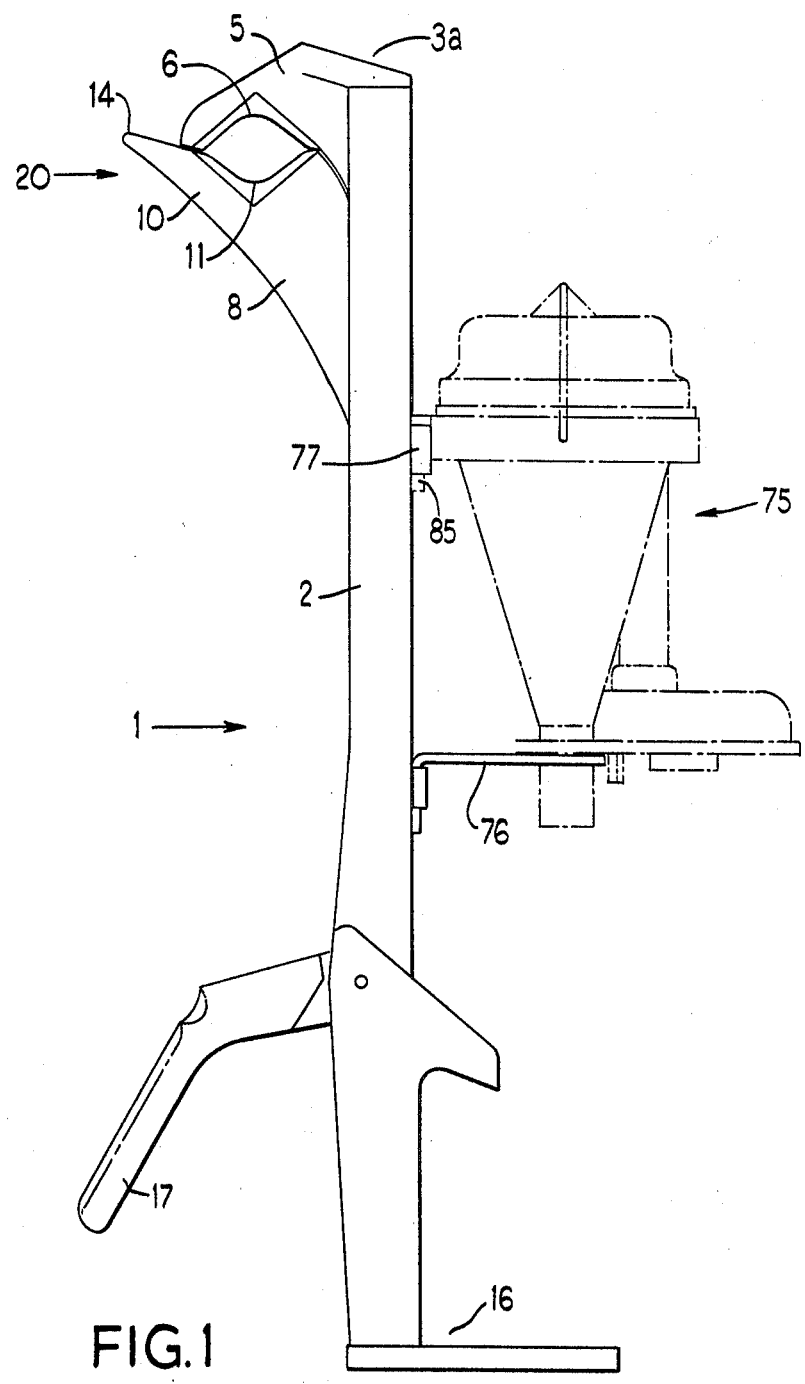

United States Patent [19]

Hartstone et al.

[11] 4,098,479
[45] Jul. 4, 1978

[54] BRACKET

[75] Inventors: John Lewis Hartstone, 11 Brookfield St., Auckland, New Zealand; Johannes Cornelis Wilhelmus Zwezerynen, Auckland, New Zealand

[73] Assignee: John, Lewis Harstone, Auckland, New Zealand

[21] Appl. No.: 526,432

[22] Filed: Nov. 22, 1974

[30] Foreign Application Priority Data

Nov. 23, 1973 [NZ] New Zealand .................. 172700

[51] Int. Cl.² .................................................. E04G 3/00
[52] U.S. Cl. ........................... 248/214; 248/226.1; 248/316 A
[58] Field of Search ............... 248/214, 215, 226 R, 248/226 B, 226 D, 316 R, 316 A, 316 C; 81/130 A, 135, 142, 146; 24/263 SB, 115 G; 269/254 R; 339/108 R, 109, 254 R, 255 R

[56] References Cited

U.S. PATENT DOCUMENTS

| 756,565 | 4/1904 | Barry | 81/135 |
|---|---|---|---|
| 877,632 | 1/1908 | Claunch | 81/135 |
| 1,082,601 | 12/1913 | McCarthy | 81/135 |
| 1,428,546 | 9/1922 | Johnston | 81/142 |
| 2,482,625 | 9/1949 | Kunkel | 24/115 G |
| 2,811,703 | 10/1957 | Becker | 339/109 |
| 2,867,787 | 1/1959 | Nilsson | 339/109 |

Primary Examiner—Robert A. Hafer
Attorney, Agent, or Firm—Cushman, Darby & Cushman

[57] ABSTRACT

This invention relates to a bracket. An elongate body member is provided and a clamping means is provided at a distal end thereof. The clamping means includes a fixed jaw member and a moveable jaw member adjustably mounted relative to said body member. Operating means including a handle are provided the other end of the body member and an elongate connecting means runs from the operating means to the clamping means. A compensating spring is provided in association with, and between the adjustable jaw member and an adjacent end of the connecting means. The arrangement of the invention is such that actuation of the operating means enables movement of said moveable jaw member relative to said fixed jaw member so as to enable attachment or removal of the bracket.

2 Claims, 4 Drawing Figures

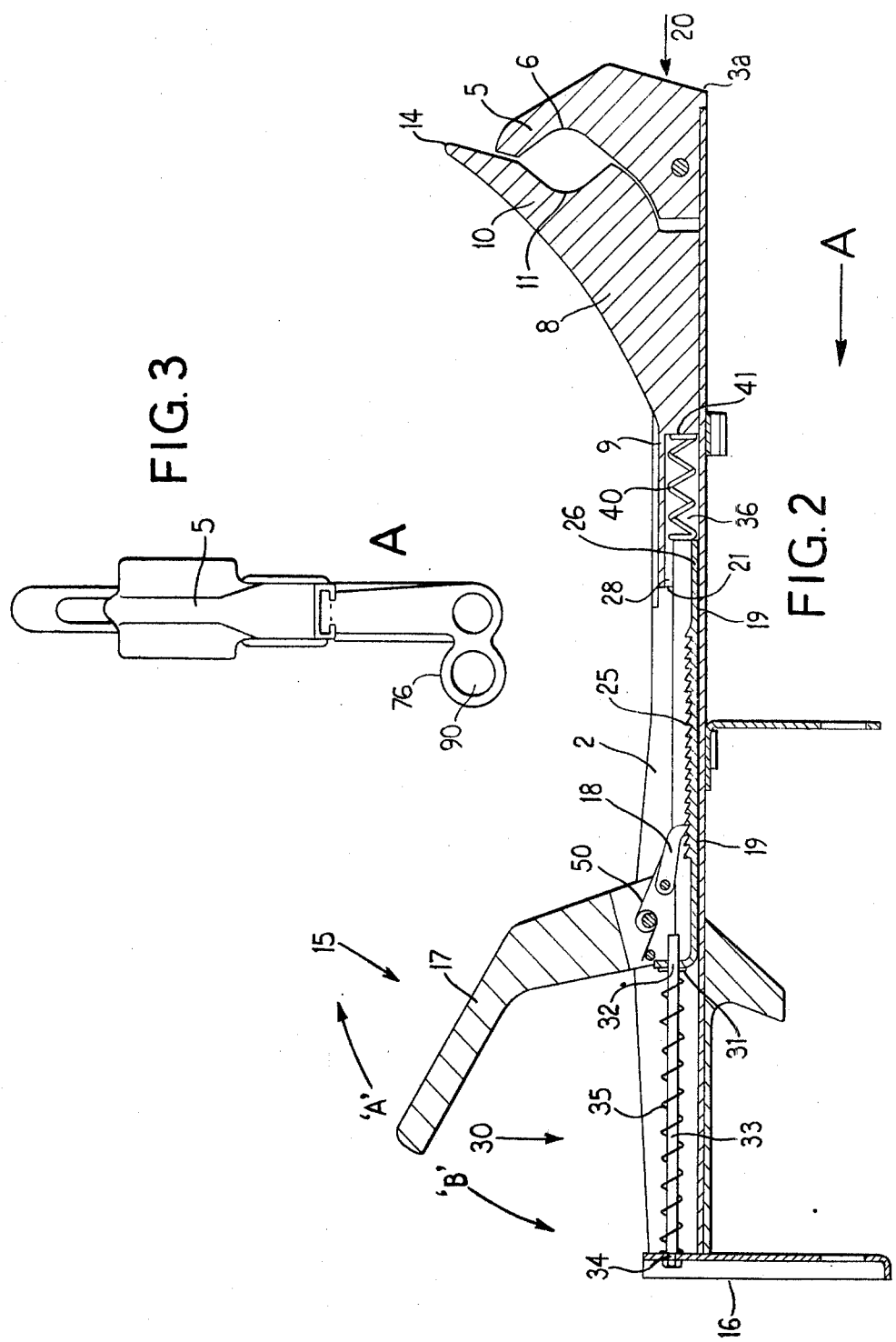

BRACKET

This invention relates to a combined clamp and bracket which is capable of supporting a desired article or articles in a predetermined position relative to a wall, pipe and the like.

It is an object of this invention to provide a straight forward and efficient clamp and bracket.

Other objects of the invention will become apparent from the following description.

For the purposes of description and definition, the invention will hereinafter be referred to, throughout the specification and claims, as "a bracket".

Accordingly, in one form the invention may be said to broadly reside in the provision of a bracket comprising an elongate body member; clamping means being provided adjacent one end thereof; operating means being spaced apart therefrom and provided adjacent a further end of said body member; elongate connecting means running between said clamping means and said operation means; said clamping means including a fixed jaw member and a moveable jaw member adjustably mounted relative to said body member; a compensating spring being provided between said moveable jaw member and an adjacent end portion of said connecting means; actuation of said operating means enabling movement of said moveable jaw member relative to said fixed jaw member, so as to enable attachment or removal of the bracket.

The present invention will now be described by way of example and with reference to the accompanying drawings, in which:

FIG. 1: is a side view of a bracket of the present invention, mounting, for example, a milk metering device.

FIG. 2: is a side, cross-sectional view of a bracket of the present invention.

FIG. 3: is an end view of a bracket.

Figure 4:
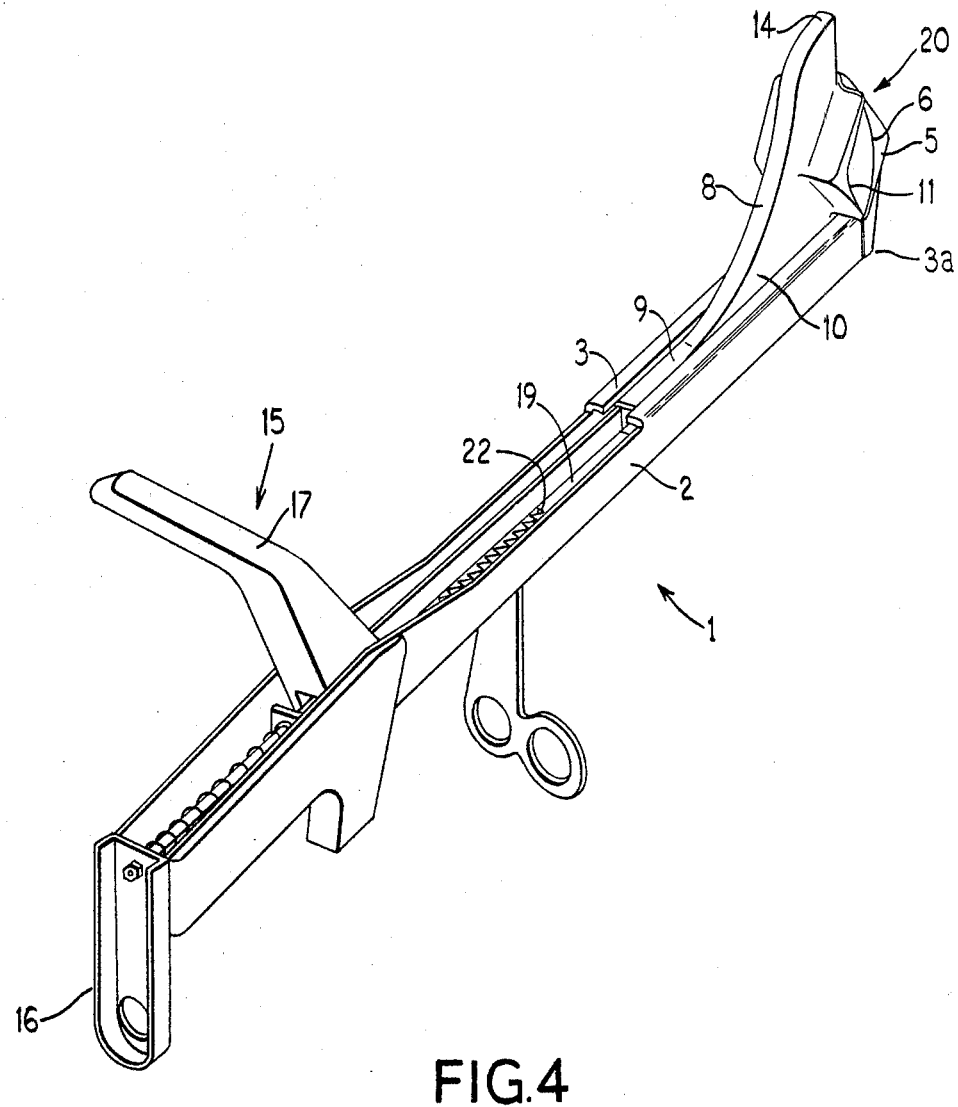

FIG. 4: is a perspective view, from side and above, of a bracket of the present invention.

As stated above, the present invention relates to a combined bracket and clamp, and for the purposes of description and definition, the invention is being referred to as "a bracket". The invention is preferably used for maintaining articles in a desired position relative to a wall or pipe, by securing the clamping means of the invention about a fixed article such as for example, a pipe or beam, any desired article or articles then being attached or mounted on the bracket.

In one form of the invention and as shown in FIG. 1 of the accompanying drawings, the bracket 1 of the present invention can be used to mount a milk metering device 75 such as a milk metering device disclosed in U.S. Pat. No. 3,349,617. It should however be appreciated that this is by way of example only, and that the bracket can be used for mounting any desired article.

When used to mount a milk metering device 75 such as disclosed in U.S. Pat. No. 3,349,617, pipe support means 76 and securing means such as at least one clip 77 may be provided, so that inlet and outlet pipes from the milk metering device may pass through suitable openings 90 of the pipe support means 76 and so that a securing lug 85 which may extend rearwardly of a milk metering device may engage with a clip 77. In use, such a bracket will be attached to a milk line pipe (for example in a milk shed or the like) by engaging the jaw members of the clamping means 20 about a pipe (not shown) and locking the jaw members about a pipe so that the milk metering device 75 will be maintained in a desired and predetermined position relative to that pipe. Once the milk metering device 75 has been used, the bracket 1 may be released from the pipe, in a manner such as will be hereinafter described and may be taken down and the contents of the milk metering device 75 emptied, alternatively the milk metering device can be detached from the bracket.

Turning now to the bracket shown in the accompanying drawings, the bracket 1 is preferably although not essentially constructed of a stainless steel or metal material although handle portions may be covered with a plastic or rubber material for handling. This is by way of example only however.

As shown in the accompanying drawings, the bracket 1 includes an elongate and at least partially open faced body member 2 which is substantially "U" shaped in cross-section, at least part of the body member being formed so that the open face is partially open, by the ends of the arms of the substantially "U" shaped body member being turned inwardly as shown at 3 in the drawings. As will be appreciated from the following description, this will provide for the sliding engagement of the base of the moveable jaw member within the body member.

At one end 3a of the body member 2 (hereinafter referred to as the distal end), the clamping means 20 includes a fixed jaw member 5 which extends outwardly at an angle from the longitudinal axis of the body member 2, the fixed jaw member 5 being formed with an integral jaw recess 6 which is adapted to fit about a pipe or some other desired article. In one form of the invention, as shown in the accompanying drawings, the recess 6 is substantially concave or "V" shaped in formation, although the recess can be of any desired shape or formation.

A moveable jaw member 8 is also provided and includes a base 9 which is slideably located within the open faced body member 2, and an integrally formed and outwardly extending arm portion 10 which extends outwardly and at an angle from the base 9 of the moveable jaw member 8 and from the longitudinal axis of the body member 2. The arm portion 10 of the moveable jaw member is provided with an integral jaw recess 11 which is adapted to correspond substantially with the jaw recess 6 of the fixed jaw member 5. The jaw recess 11 in the moveable jaw member 8 is also substantially concave or "V" shaped in formation, although it can be of any desired shape or formation.

The moveable jaw member 8 is also provided with an outwardly depending lug or lip member 14 which extends outwardly beyond the jaw recess 11 and which is adapted to be used in the location of the clamping means 20 and the jaw members 5 and 8 about an article such as for example an elongate pipe (not shown). The use of the lip or lug member 14 will be more fully appreciated from the following description.

Operating means 15 are provided adjacent the other end 16 of the body member 1 (hereinafter referred to as "the butt end").

The operating means 15 includes a handle member 17 which is pivotally located about a pivot pin which passes between the sides of the open faced body member 2 and which is provided with a spring loaded pawl 18.

An elongate connecting means 19 such as elongate strip of metal and the like runs from a position substantially adjacent and below the handle 17 to the base 9 of the moveable jaw member 8 and is attached to, located in, or in abuttment with an end surface 21 of the base 9 of the moveable jaw member 8. The elongate connecting means 19 may be substantially "U" shaped in cross-section and may be located within the open face body member 2, an upper surface 22 of the connecting means 19, substantially adjacent and below the handle 17 and the pawl 18 being provided with a plurality of spaced apart, transverse, ribs or teeth 25, such that operation of the handle 17 and pawl 18 may result in the pawl 18 engaging with the ribs or teeth 25, so as to move the connecting means 19 and the moveable jaw member 8 towards the fixed jaw member 5 and the distal end of the bracket 1.

In a preferred form of the invention an upper or distal portion 26 of the connecting means 19 is turned over or reduced in width and is adapted to be located within a bore or recess 28 within the base 9 of the moveable jaw member 8. However in other forms of the invention an end of the connecting means 19 may abut against an adjacent end surface 21 of the base 9 or alternatively may be connected thereto by some other suitable means of attachment.

A bottom or butt end 30 of the connecting means 19 is provided with a substantially transverse end plate 31 which has at least one hole 32 therein, through which an elongate rod 33 is secured such as by means of nuts and the like or a burred or turned over end, the rod 33 then passing through the remainder of the lower portion of the open faced body member 2 and passing through a suitable bore or location hole 34 in a lower closed end of the base portion so as to be secured in position such as by means of nuts and the like. A primary spring member 35 may be placed about the rod and the ends of the spring may abut against inner surfaces of the transverse end plate 31 of the connecting means 19 and the end of the base portion of the bracket, so as to provide the connecting means 19 with a normal spring bias towards the distal end 3a of the bracket 1 and such that the bias will normally hold or urge the connecting means 19 in a position in which the moveable jaw member 8 is in a position in juxtaposition with the fixed jaw member 5.

As will be appreciated from the accompanying drawings, the base 9 of the moveable jaw member 8 has an elongate recess 28 therein, said recess being closed at its innermost end. A compensating spring 40 of a suitable steel material is located within the bore and abuts against the inner closed end 41 of the bore and an adjacent distal end of the connecting means 19 or a plate such as a spring locating plate (not shown) which may be attached to or adjacent a distal end of the connecting means 19.

The use and location of the bracket 1 will now be described by way of example only.

In use, the bracket 1 will be attached to a pipe (not shown) such as for example a pipe of a milk line. The handle 17 will be moved in a direction of arrow B such as in FIG. 2 of the drawings, so that the pawl 18 is held free of the transverse ribs or teeth 25 of the connecting means 19, such as by means of a spring clip arrangement 50. The lip 14 of the moveable jaw member 8 will then be placed against, for example, an under surface of the pipe and an upward pressure will be applied by an operator. This will cause the moveable jaw member 8 to move downwardly against the bias of the primary spring 35 until such time as there is sufficient distance between the moveable jaw member 8 and the fixed jaw member 5 to enable an operator to slip or move the bracket so that the jaws will be positioned about the pipe. The bias of the primary spring 35 will then return the moveable jaw member 8 to a position about the pipe and the handle can then be actuated (such as moved in direction of arrow A in FIG. 2 of the drawings) so that the pawl 18 will engage with the ribs or teeth 25 of the connecting means 19 so as to secure the jaw members and jaw recesses securely about the pipe. Once a relatively fixed position or secure position has been reached, in which the pawl has engaged with the teeth, and the jaw members are relatively tight and secure about the pipe, the handle will be moved into a position of rest, by virtue of an over-centre operation, such an operation causing the pawl, securely engaged with one of the ribs, 25 to move the elongate connecting means against the bias of the compensating spring and thus maintaining the moveable jaw member 8 and the jaw recess 11 thereof about the pipe.

The compensating spring 40 acts to ensure that no excess pressure is applied which might be damaging, for example to the pipe, and compensates for and adjusts excess pressure which may have been applied to the adjustable jaw member 8. In addition, the compensating spring 40 between the end of the connecting means 19 and the moveable jaw member 8 allows for the secure location of the pawl in abuttment with the teeth or ribs 25 and enables the secure location of the handle in a position of rest, after having been placed in that position (such as in the direction of arrow "B") by an over-centre type action, as described hereinbefore, so as to hold the jaw member 8 in a desired position and at a desired pressure against a pipe.

To remove the bracket 1 from a pipe (not shown), the handle 17 is moved out of its rest position, and this disengages the pawl 18 from the ribs or teeth 25 of the connecting means 19. As indicated earlier, spring arrangement 50 will hold the pawl free of the ribs or teeth 25 and this will enable an operator to apply an upward movement to the bracket which will cause the moveable jaw member 8 to move downwardly relative to the body member 2 of the bracket 1, so that once there is sufficient space between the jaw members 5 and 8 (and the jaw recesses), the bracket 1 may be slipped or moved out of position.

The present invention is particularly advantageous in that it enables an operator such as an operator in a milking shed, to locate the bracket with only one hand, in that as will be appreciated from the foregoing description, the operation of the handle, to free the pawl from the ribs or teeth, enables the free movement of the moveable jaw member 8 by location of the lip portion 14 of the moveable jaw member 8 against a pipe and once there is sufficient distance between the jaw members 5 and 8, and the jaws have been placed about a pipe, the operator may, still using only one hand, operate the handle member and pawl arrangement, until such time as the moveable jaw member 8 is firmly located against a surface of the pipe. At this time the handle member will be locked into its position of rest by its over-centre action, and the bracket secured about the pipe.

It should be appreciated that while the invention has been described as being particularly advantageous in mounting a milk meter such as that described in U.S. Pat. No. 3,349,617, the invention has equal advantage in mounting other articles.

The present invention has been described by way of example only and it will be appreciated that modifications and improvements may be made to the invention without departing from the scope thereof, as defined in the appended claims.

We claim:

1. A bracket comprising an elongate body member having an at least partially open face; clamping means being provided adjacent one end of said body member; operating means being spaced from said clamping means and being located adjacent a further end of said body member; said clamping means including a fixed jaw member and a movable jaw member having a base slidably mounted within said body member; said operating means including a handle pivotally mounted to said body member and being attached to, so as to operate, a pawl; elongate connecting means being positioned within the body member and extending from a position substantially adjacent and below the operating means to a recess in the base of said movable jaw member; a portion of the connecting means adjacent said operating means being provided with a plurality of spaced apart, transverse ribs thereon, and such that in use, operation of the handle will permit the pawl to engage with the ribs; a primary spring passing between a butt end of the connecting means and an inner surface of said body member at the opposite end of said body member from the clamping means, the primary spring being so biased as to normally urge the connecting means towards the base of the movable jaw member; a compensating spring being provided within the recess in the base of the movable jaw member so as to abut against and run between said movable jaw member and an adjacent end of said elongate connecting means in order to compensate for excess pressure applied to said connecting means; and a locating lip on said movable jaw member extending outwardly beyond a lip on said fixed jaw member.

2. A bracket of claim 1 wherein said fixed jaw member and said movable jaw member are each formed with a jaw recess adapted in use to pass about an article to which the bracket is to be attached.

* * * * *